(12) United States Patent  
Nikkanen et al.

(10) Patent No.: US 7,889,266 B2
(45) Date of Patent: Feb. 15, 2011

(54) IMAGE CAPTURE IN AUTO-FOCUS DIGITAL CAMERAS

(75) Inventors: Jarno Nikkanen, Tampere (FI); Vitali Samodourov, Tampere (FI); Ossi Kalevo, Toijala (FI)

(73) Assignee: Nokia Corporation, Espoo (FI)

(*) Notice: Subject to any disclaimer, the term of this patent is extended or adjusted under 35 U.S.C. 154(b) by 727 days.

(21) Appl. No.: 11/598,219

(22) Filed: Nov. 10, 2006

(65) Prior Publication Data

US 2008/0111910 A1    May 15, 2008

(51) Int. Cl.
*H04N 5/232* (2006.01)
(52) U.S. Cl. ........................... 348/345; 348/346
(58) Field of Classification Search ............ 348/345, 348/346
See application file for complete search history.

(56) References Cited

U.S. PATENT DOCUMENTS 6,683,651 B1 * 1/2004 Motta et al. ............... 348/345
2004/0165100 A1 * 8/2004 Motta ....................... 348/362
2005/0001924 A1   1/2005 Honda ....................... 348/348
2006/0001764 A1   1/2006 Stavely et al. ............. 348/362
2007/0216796 A1   9/2007 Lenel et al. ................ 348/345

* cited by examiner

*Primary Examiner*—James M Hannett
(74) *Attorney, Agent, or Firm*—Ware, Fressola, Van Der Sluys & Adolphson, LLP (57) ABSTRACT

In an AF camera having a two-stage capture button or a three-stage capture button, a timing control module or algorithm is used to control the type of image a user can obtain after the user presses and releases the capture button. The timing control allows the user to capture an image of the scene substantially as presented on the viewfinder when the automatic focusing algorithm carries out its focusing function, or to capture an image of a recomposed scene after the focusing function is completed. If the user releases the capture button before the automatic focusing algorithm finishes its focusing function, the image obtained is the image focused at the hyperfocal distance.

31 Claims, 7 Drawing Sheets

| Step | Use Case 1 (quick image capture) |
|---|---|
| 0 | Initial state (camera on, VF running, hyperfocal distance) |
| 1 | Capture button half pressed |
| 2 | Capture raw frame 1 using hyperfocal distance |
| 3 | Start AF algorithm and continue viewfinding |
| 4 | Capture button fully pressed and/or Capture button released |
| 5 | Process and save raw frame 1 |
| 6 | USE CASE ENDS |

FIG. 1

| Step | Use Case 4 (quick image capture) |
|---|---|
| 0 | Initial state (camera on, VF running, hyperfocal distance) |
| 1 | Capture button pressed |
| 2 | Capture raw frame 1 using hyperfocal distance |
| 3 | Start AF algorithm and continue viewfinding |
| 4 | Capture button released |
| 5 | Process and save raw frame 1 |
| 6 | USE CASE ENDS |

FIG. 4

| Step | Use Case 2 (normal image capture with AF) |
|---|---|
| 0 | Initial state (camera on, VF running, hyperfocal distance) |
| 1 | Capture button half pressed |
| 2 | Capture raw frame 1 using hyperfocal distance |
| 3 | Start AF algorithm and continue viewfinding |
| 4 | AF finishes |
| 5 | Capture raw frame 2, overwirte raw frame 1 |
| 6 | Indicate focus lock/fail to user (sound, target sign color change etc.) |
| 7 | Start time counter |
| 8 | Capture button fully pressed |
| 9 | Capture button released |
| 10 | Process and save raw frame 2 |
| 11 | USE CASE ENDS |

FIG. 2

| Step | Use Case 3 (focus-and recompose image capture with AF) |
|---|---|
| 0 | Initial state (camera on, VF running, hyperfocal distance) |
| 1 | Capture button half pressed |
| 2 | Capture raw frame 1 using hyperfocal distance |
| 3 | Start AF algorithm and continue viewfinding |
| 4 | AF finishes |
| 5 | Capture raw frame 2, overwrite raw frame 1 |
| 6 | Indicate focus lock/fail to user (sound, target sign color change etc.) |
| 7 | Start time counter |
| 8 | Time counter reaches threshold time, e.g. 0.75s |
| 9 | Indicate "recompose state" to user (sound, target sign color change etc.) |
| 10 | User recomposes image framing |
| 11 | Capture button fully pressed |
| 12 | Capture button released |
| 13 | Capture raw frame 3, overwrite raw frame 2 |
| 14 | Process and save raw frame 3 |
| 15 | USE CASE ENDS |

FIG. 3

| Step | Use Case 5 (normal image capture with AF) |
|---|---|
| 0 | Initial state (camera on, VF running, hyperfocal distance) |
| 1 | Capture button pressed |
| 2 | Capture raw frame 1 using hyperfocal distance |
| 3 | Start AF algorithm and continue viewfinding |
| 4 | AF finishes |
| 5 | Capture raw frame 2, overwirte raw frame 1 |
| 6 | Indicate focus lock/fail to user (sound, target sign color change etc.) |
| 7 | Start time counter |
| 8 | Capture button released |
| 9 | Process and save raw frame 2 |
| 10 | USE CASE ENDS |

FIG. 5

| Step | Use Case 6 (focus-and recompose image capture with AF) |
|---|---|
| 0 | Initial state (camera on, VF running, hyperfocal distance) |
| 1 | Capture button pressed |
| 2 | Capture raw frame 1 using hyperfocal distance |
| 3 | Start AF algorithm and continue viewfinding |
| 4 | AF finishes |
| 5 | Capture raw frame 2, overwrite raw frame 1 |
| 6 | Indicate focus lock/fail to user (sound, target sign color change etc.) |
| 7 | Start time counter |
| 8 | Time counter reaches threshold time, e.g. 0.75s |
| 9 | Indicate "recompose state" to user (sound, target sign color change etc.) |
| 10 | User recomposes image framing |
| 11 | Capture button released |
| 12 | Capture raw frame 3, overwrite raw frame 2 |
| 13 | Process and save raw frame 3 |
| 14 | USE CASE ENDS |

IMAGE CAPTURE IN AUTO-FOCUS DIGITAL CAMERAS

FIELD OF THE INVENTION

The present invention relates to digital cameras and, more specifically, to digital cameras having an auto-focus feature.

BACKGROUND OF THE INVENTION

Auto-focus (AF) camera modules are commonly used in digital cameras and in mobile terminals having imaging capability. An automatic focusing algorithm is also commonly used in those camera modules for image capture. Many existing automatic focusing algorithms rely on hyperfocal distance focusing in image capture. In photography, depth-of-field (DOF) is defined as the distance in front of and behind the subject that appears to be in focus. Hyperfocal distance is such distance that if a camera is focused in that distance, then everything from half the focused distance to infinity will be within DOF.

Typically the DOF in a mobile imaging phone is very large, due to the small physical size of the camera module and the small lens aperture. In a typical mobile AF camera module, the hyperfocal distance is roughly 2 m (80 inches). Thus, when the camera is focused at 2 m, everything from 1 m to infinity appears to be in focus. For that reason, focusing at the hyperfocal distance can handle most image capture situations.

Nevertheless, AF cameras having an automatic focusing algorithm have a number of problems. These problems are also dependent upon whether the camera uses a two-stage capture button or a three-stage capture button. In a camera with a three-stage capture button, the first stage is the capture button not being pressed; the second stage is the capture button being half pressed for focusing purposes; and the third stage is the capture button being fully pressed for image capture. In a camera with a two-stage capture button, one stage is the capture button not being pressed and the other stage is the capture button pressed for image capture.

One of the problems associated with the automatic focusing algorithm is the long shutter lag in AF cameras. The user needs to wait for the automatic focusing algorithm to finish before the image can be captured. The moment that is intended to be captured can be lost because of the wait. The existing solution to this problem is that, if the capture button is fully pressed before the AF algorithm has finished searching optimal focus distance, then the image is captured with current focus distance, or focus is moved to hyperfocal distance and then the image is captured.

Another problem is that the camera shakes as the three-stage capture button is pressed fully to capture an image. The camera shake often results in a blurred image when pictures are taken indoor and in other low light situations where the exposure time needs to be sufficiently long. In a typical AF camera, one or more frames are captured after the capture button has been fully pressed, and the camera may be shaking during multiple frames after the capture button is pressed. Motion-blur most likely occurs in the image captured immediately after the capture button is fully pressed. The camera is shaken more easily because the third stage of button press requires a harder press than the second stage. As a solution to the problem, the user is instructed to try to keep the camera steady in low light situations, even when pressing the capture button.

Furthermore, in some imaging products, only two stage capture buttons are used. The problem is how to control AF and image capture with this kind of capture button. Typically, when the two-stage capture button is pressed, the automatic focusing algorithm is immediately initiated, but the image is not captured until the automatic focusing algorithm has found the focus. As such, the user has to wait for the automatic focusing algorithm to finish.

In capturing images of a moving object or capturing images in a low light situation, the existing image capture methods can be undesirable. Thus, it is advantageous to provide an image capture method that improves performance and quality with regard to the above-mentioned problems.

SUMMARY OF THE INVENTION

In an AF camera having a two-stage capture button or a three-stage capture button, a timing control module or algorithm is used to control the type of image a user can obtain as the user presses and releases the capture button for taking pictures. The timing control allows the user to capture an image of the scene substantially as presented on the viewfinder when the automatic focusing algorithm carries out its focusing function, or to capture an image of a recomposed scene after the focusing function is completed. If the user releases the capture button before the automatic focusing algorithm finishes its focusing function, the image obtained is the image focused at the hyperfocal distance. According to the present invention, a raw image focused at a hyperfocal distance is captured soon after the capture button is pressed. This raw image is saved and processed if the capture button is released before the autofocus function is completed and a second raw image is captured. The second raw image is saved and processed if the capture button is released before a third raw image is captured for a recomposed scene. As such, the user may obtain an image focused at the hyperfocal distance, a normal AF image or an AF image of a recomposed scene. In one embodiment of the present invention, all three raw images may be saved and processed.

Thus, the first aspect of the present invention is a method for image capture in a camera having a capture button for image capturing, the camera comprising an automatic focusing module for carrying out focusing function in response to a pressing of the capture button. The method comprises:

capturing a first raw image at a hyperfocal distance in response to the pressing of the capture button;

keeping the first raw image at least before the focusing function is finished;

processing the first raw image if the capture button is released before the focusing function is finished; or capturing a second raw image to overwrite the first raw image after the focusing function is finished and processing the second raw image if the capture button is released before the predetermined time period has expired, or capturing a third raw image to overwrite the second raw image after the predetermined time period has expired.

The method can be used in a camera having a two-stage capture button or a three-stage capture button, the three-stage capture button operable in a half-pressed position and in a fully-pressed position.

With a three-stage capture button, the capturing of the first raw image is in response to the pressing of the capture button to the half-pressed position, and the first raw image is processed if the capture button is pressed to the fully-pressed position before the capture button is released before the focusing function is finished.

Advantageously, the capturing of a second raw image to overwrite the first raw image occurs after the focusing function is finished; and the second raw image is processed if the capture button is pressed to the fully-pressed position before the predetermined time period has expired.

Advantageously, the third raw image is captured if the capture button is pressed to the fully-pressed position after the predetermined time period has expired. In one embodiment of the present invention, the capturing of the third raw image overwrites the second raw image if the capture button is pressed to the fully-pressed position and then released after the predetermined time period has expired.

The second aspect of the present invention is an automatic focusing camera module for use with a lens arranged for forming an image on an image sensor at a separation distance. The module comprises:

a driving mechanism, operatively connected to one of the lens and the image sensor, for controlling the separation distance;

an automatic focusing control, operatively connected to the driving mechanism, for changing the separation distance for focusing purposes, wherein the focusing control is adapted to carry out a focusing function in response to a pressing of a capture button; and a processor, operatively connected to the focusing control and the image sensor, wherein the processor is adapted for carrying out the method of image capture as described in reference to the first aspect of the present invention.

The third aspect of the present invention is a device, such as a digital camera, a mobile phone or any device having image capture capability, having an automatic focusing camera module as described in reference to the second aspect of the present invention.

The fourth aspect of the present invention is a software application product comprising a computer readable medium having a software application, wherein the software application comprises program codes to carry out the image capture method as described in reference to the first aspect of the present invention.

The present invention will become apparent upon reading the description taken in conjunction with FIGS. 1 to 8.

DETAILED DESCRIPTION OF THE INVENTION

The present invention treats cameras with a three-stage capture button differently from cameras with a two-stage capture button. There are three use cases regarding cameras with a three-stage capture button and three use cases regarding cameras with a two-stage capture button.

In each of the three use cases regarding cameras with a three-stage capture button, the image capture starts with common steps 0 to 3. Step 0 is the initial state starting when the camera power is turned on. The initial state includes running the view-finding function and setting the focus at the hyperfocal distance. Step 1 is defined as when the capture button is half pressed for focusing. At step 2, a raw frame of image is captured at the hyperfocal distance as set at the initial state. At step 3, the automatic focusing algorithm starts its focusing function and the view-finding function continues to run.

Figure 1:
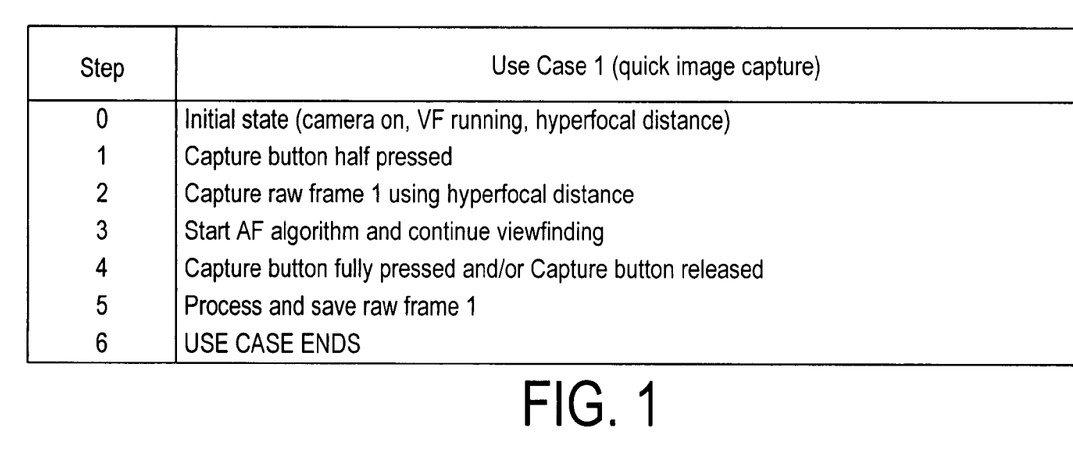
FIG. 1 illustrates a method of image capture with a three-stage capture button, according to one embodiment of the present invention.

In the embodiment of the present invention referred to as Use Case 1 and shown in FIG. 1, the capture button can be fully pressed or released at step 4. The raw frame is processed and saved at step 5 and the use case ends at step 6.

Figure 2:
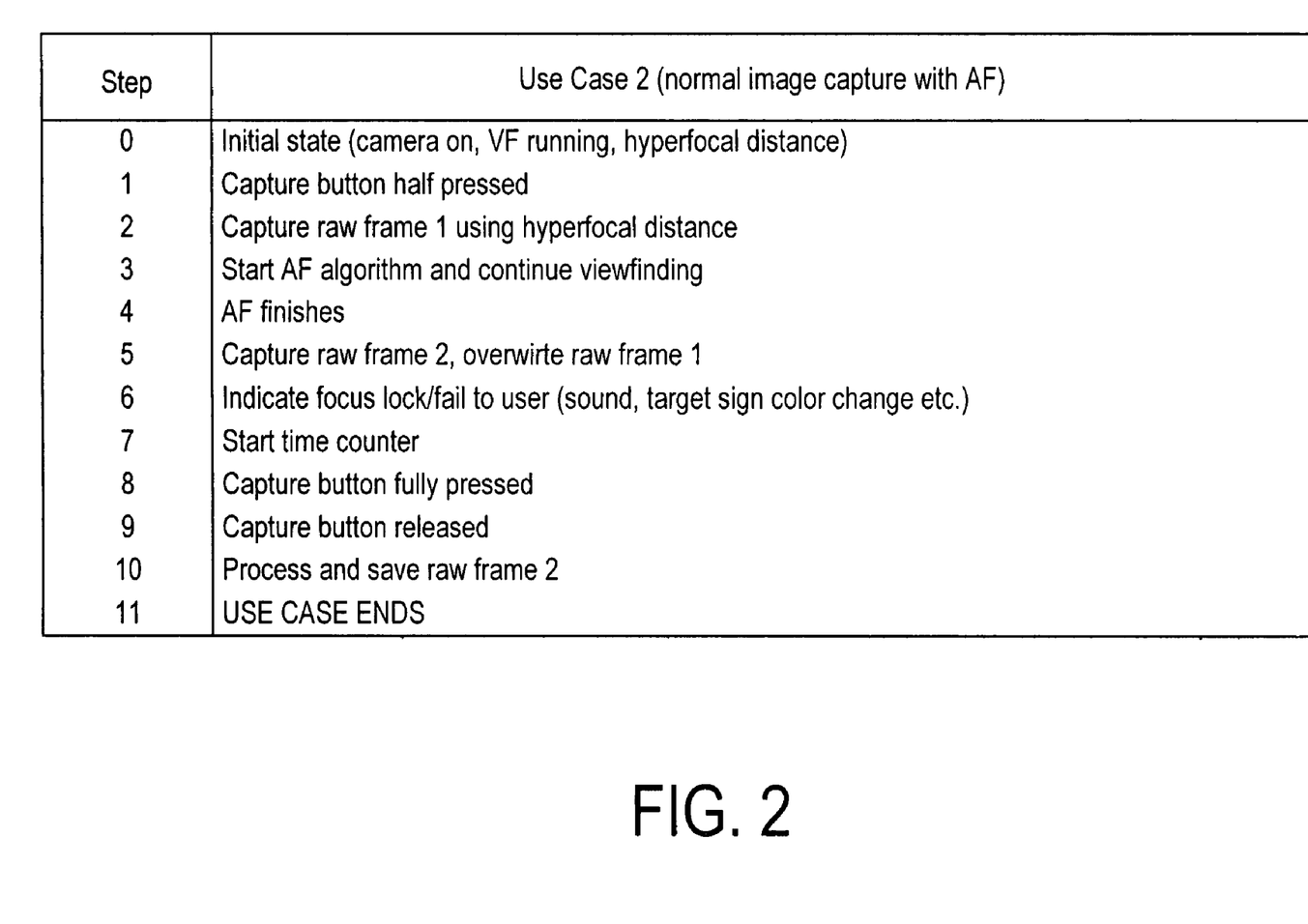
FIG. 2 illustrates a method of image capture with a three-stage capture button, according to another embodiment of the present invention.

In the embodiment of the present invention referred to as Use Case 2 and shown in FIG. 2, the automatic focusing algorithm finishes its focusing function at step 4. A second raw frame is captured at step 5 to overwrite the previously captured raw frame. At step 6, sound or target sign color change is used to indicate focus lock/fail to the user. At step 7, a time counter starts. At step 8, the capture button is fully pressed. At step 9, the capture button is released. The second raw frame is processed and saved at step 10 and the use case ends at step 11.

Figure 3:
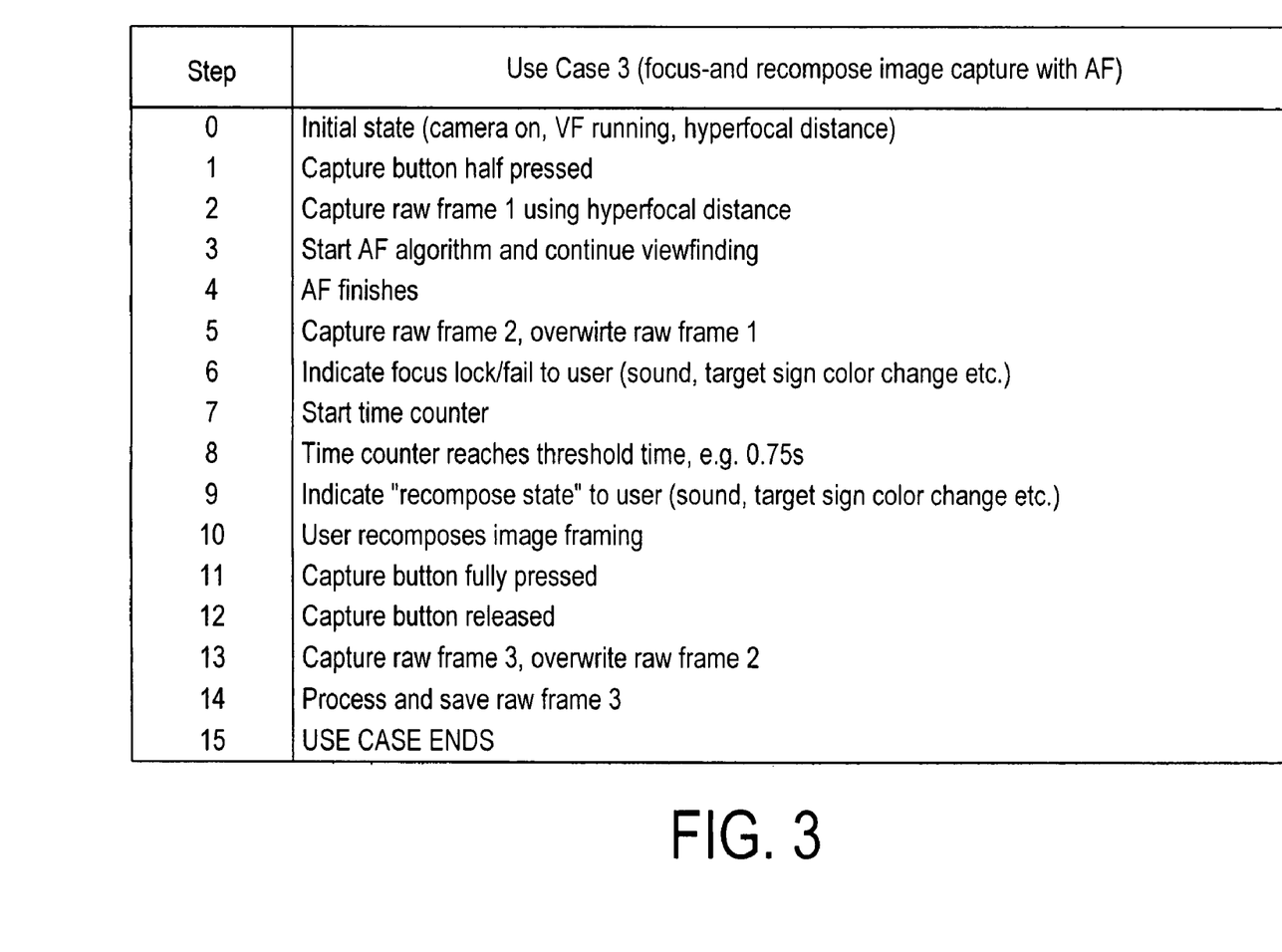
FIG. 3 illustrates a method of image capture with a three-stage capture button, according to a different embodiment of the present invention.

In the embodiment of the present invention referred to as Use Case 3 and shown in FIG. 3, the automatic focusing algorithm finishes its focusing function at step 4. A second raw frame is captured at step 5 to overwrite the previously captured raw frame. At step 6, sound or target sign color change is used to indicate focus lock/fail to the user. At step 7, a time counter starts. The time counter reaches a predetermined threshold time of 0.75 s, for example, at step 8. At step 9, sound or target sign color change is used to indicate a "recompose state" to the user to allow the user to recompose the image frame while maintaining the same focusing distance at step 10. At step 11, the capture button is fully pressed. At step 12, the capture button is released. A third raw frame is captured to overwrite the second raw frame at step 13. The third raw frame is processed and saved at step 14 and the use case ends at step 15.

The Use Cases 1 to 3 can be implemented as three image capturing modes of an image device, allowing a user to choose one of modes at any time for taking pictures. However, all use cases can also be covered with one automatic mode: If the capture button is pressed and released before AF has finished, then the image is captured as in Use Case 1. If the user has time to wait until AF has finished and then the capture button is pressed and released, then the image is captured as in Use Case 2. And finally, if the user waits for more than the pre-determined time period that was mentioned earlier after AF has finished, then the camera will switch to the recompose state and the image will be captured as in Use Case 3. This kind of automatic operation is possible because the beginning of a use case is always the same as the beginning of the previous use case, and the different use cases are separated by the moment at which the user presses and releases the capture button. That is, Use Case 2 starts to differ from Use Case 1 at step 4, and Use Case 3 starts to differ from Use Case 2 at step 8.

In each of the three use cases regarding cameras with a two-stage capture button, the image capture starts with common steps 0 to 3. Step 0 is the initial state starting when the camera power is turned on. The initial state includes running the view-finding function and setting the focus at the hyperfocal distance. Step 1 is defined as when the capture button is pressed. At step 2, a raw frame of image is captured at the hyperfocal distance as set at the initial state. At step 3, the automatic focusing algorithm starts its focusing function and the view-finding function continues to run.

Figure 4:
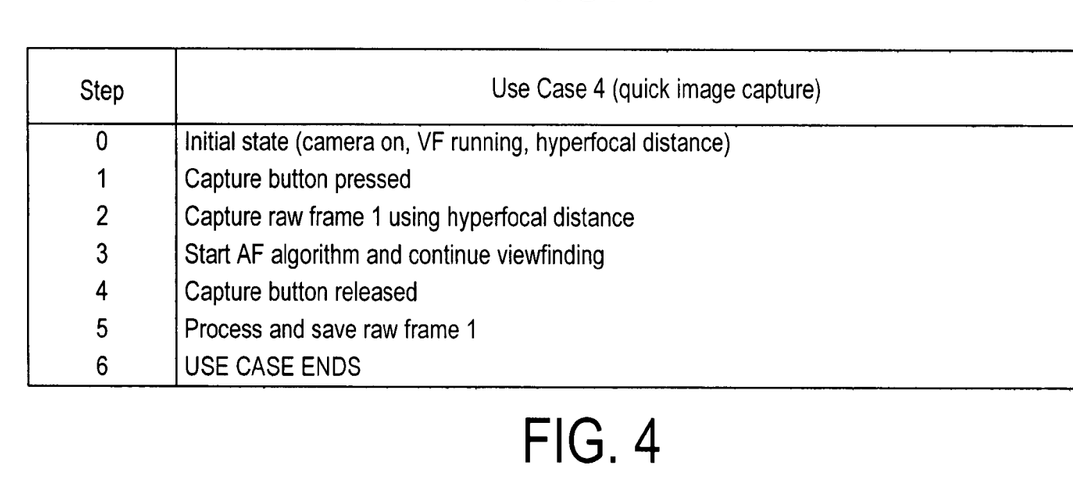
FIG. 4 illustrates a method of image capture with a two-stage capture button, according to one embodiment of the present invention.

In the embodiment of the present invention referred to as Use Case 4 and shown in FIG. 4, the capture button is released at step 4. The raw frame is processed and saved at step 5 and the use case ends at step 6.

Figure 5:
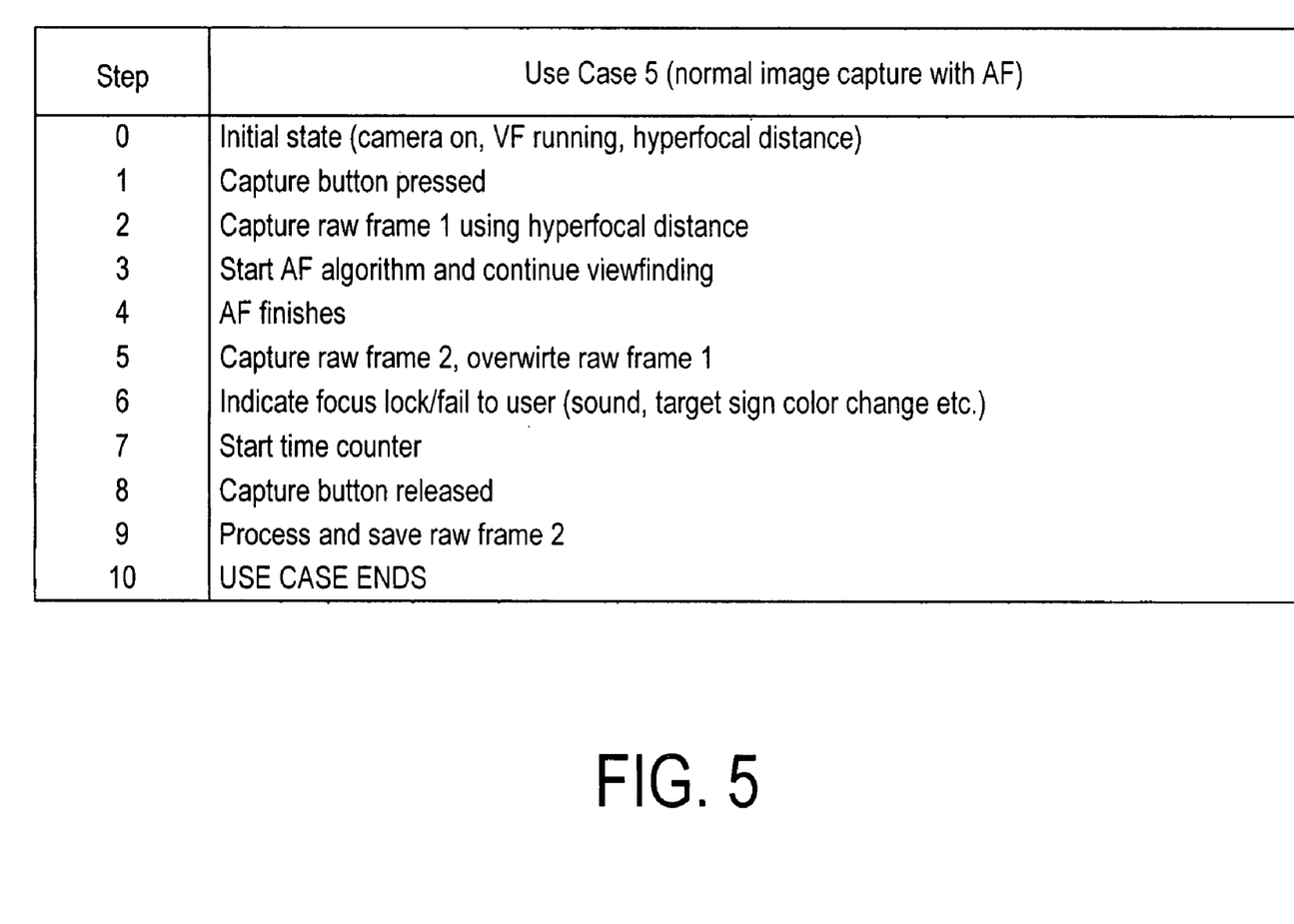
FIG. 5 illustrates a method of image capture with a two-stage capture button, according to another embodiment of the present invention.

In the embodiment of the present invention referred to as Use Case 5 and shown in FIG. 5, the automatic focusing algorithm finishes its focusing function at step 4. A second raw frame is captured at step 5 to overwrite the previously captured raw frame. At step 6, sound or target sign color change is used to indicate focus lock/fail to the user. At step 7, a time counter starts. At step 8, the capture button is released. The second raw frame is processed and saved at step 9 and the use case ends at step 10.

Figure 6:
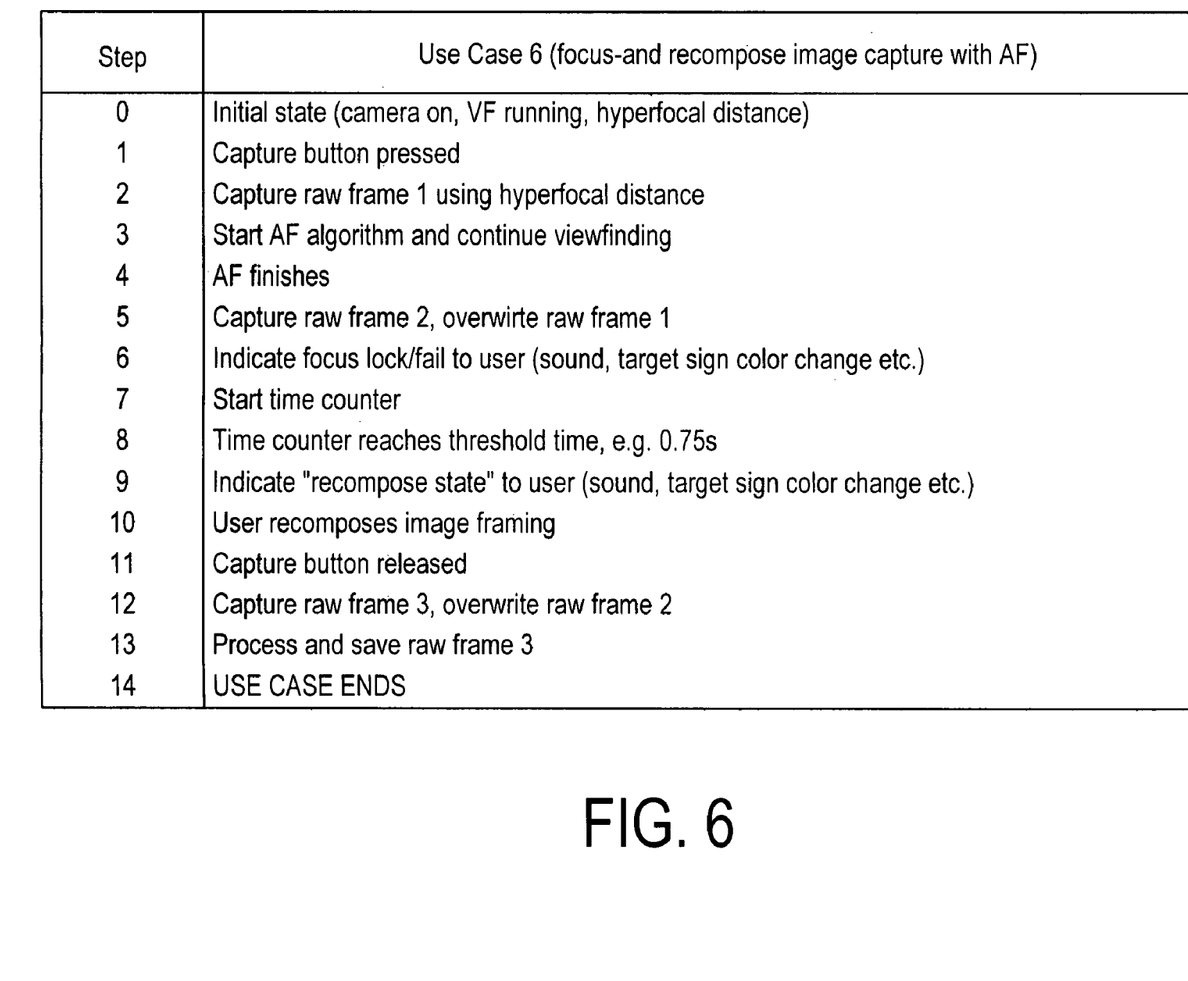
FIG. 6 illustrates a method of image capture with a two-stage capture button, according to yet another embodiment of the present invention.

In the embodiment of the present invention referred to as Use Case 6 and shown in FIG. 6, the automatic focusing algorithm finishes its focusing function at step 4. A second raw frame is captured at step 5 to overwrite the previously captured raw frame. At step 6, sound or target sign color change is used to indicate focus lock/fail to the user. At step 7, a time counter starts. The time counter reaches a predetermined threshold time of 0.75 s, for example, at step 8. At step 9, sound or target sign color change is used to indicate a "recompose state" to the user to allow the user to recompose the image frame at step 10. At step 11, the capture button is released. A third raw frame is captured to overwrite the second raw frame at step 12. The third raw frame is processed and saved at step 13 and the use case ends at step 14.

The Use Cases 4 to 6 can be implemented as three image capturing modes of an image device, allowing a user to choose one of the modes at any time for taking pictures. However, all use cases can also be covered with one automatic mode, similar to the implementation of the three stage button Use Cases 1-3 above. For example, if the user presses the capture button fully and releases it before AF finishes, the result would be having the raw frame 1 saved and processed as in Use Case 4. If the user presses the capture button fully and releases the capture button soon after the capture of raw frame 2, the result would be having the raw frame 2 saved and processed as in Use Case 5. If the user presses the capture button fully and releases it after the recompose state, the result would be Use Case 6.

According to a different embodiment of the present invention, it is possible to save and process raw frames 1 and 2 in Use Case 3 and Use Case 6 and stored the processed frames 1, 2 and 3. As such, by completing the steps in Use Case 3 or Use Case 6, the user is able to have one processed image captured at the hyperfocal distance, one processed normal AF image and one recomposed AF image.

In sum, the image capture methods, according various embodiments of the present invention, reduce capture latency by using the hyperfocal distance and by capturing a raw image even before starting the automatic focusing algorithm. This raw image is processed and saved or overwritten depending on the use cases. With this feature, image capturing does not need to wait until the completion of automatic focusing. Thus, in Use Cases 1, 2, 4 and 5, an image is captured even before the capture button is fully pressed and, therefore, the shutter lag problem associated with the computation involved with the automatic focusing algorithm can be reduced.

Furthermore, the camera shaking problem usually associated with the pressing of the capture button can be reduced. In Use Cases 1, 2, 4 and 5, an image is already captured when the capture button is pressed halfway. A halfway press does not usually cause the camera to shake as much as a full press. In Use Cases 3 and 6, the image can be captured after the releasing of the capture button. A capture button release does not usually cause the camera to shake as much as a capture button press. In an auto-focus camera with a two-stage capture button, it is possible to enable fast image capturing.

With the various embodiments of the present invention, the common features of focus-and-recompose technique and prefocusing can be maintained. The camera is easy to use and the user is not required to learn any new picture taking skills to produce good images.

With the all the advantages of the present invention, the camera module only requires a memory buffer to store one raw frame—the first or second raw frame.

Figure 7:
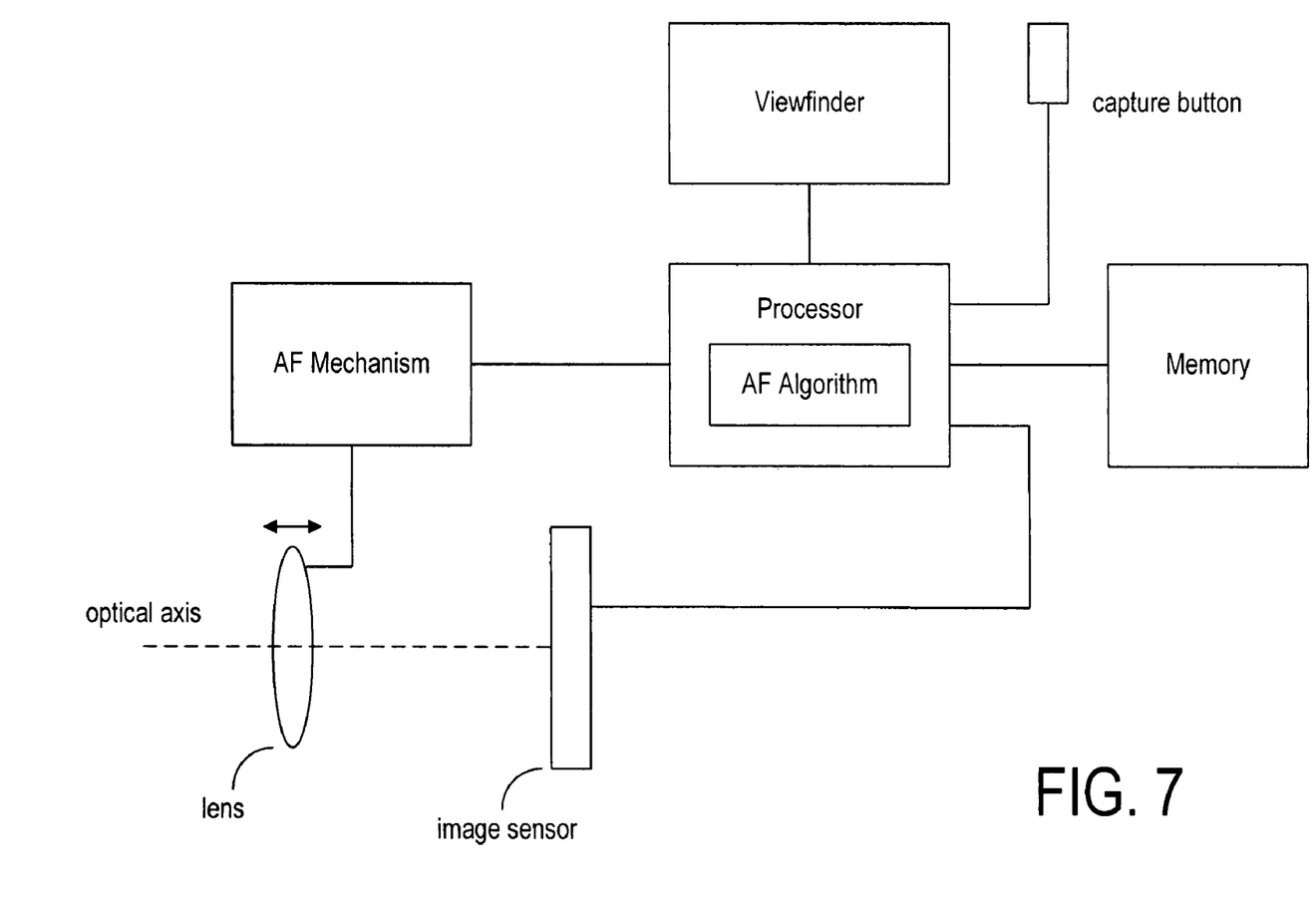
FIG. 7 illustrates an auto-focus camera module having a processor to carry out one or more of the image-capture methods, according to the present invention.

The present invention can be implemented in an auto-focus camera module as shown in FIG. 7. As shown in FIG. 7, the module comprises a lens for image formation on an image sensor. The lens or the image sensor is driven by an auto-focus mechanism controlled by a processor. The processor comprises a software application product including an auto-focus algorithm for carrying out at least some of the steps as illustrated in FIGS. 1 to 6. The module also comprises a memory to store raw or processed images, and an image display which can also be used as a view-finder. The processor is operatively connected to the capture button for initiating the image capture process.

Accordingly, the automatic focusing camera module, according to one embodiment of the present invention, may include a driving mechanism, operatively connected to one of the lens and the image sensor, for controlling the separation distance; an automatic focusing control, operatively connected to the driving mechanism, for changing the separation distance for focusing purposes, wherein the focusing control is adapted to carry out a focusing function in response to a pressing of a capture button; and a processor, operatively connected to the focusing control and the image sensor, wherein the processor is adapted for capturing a first raw image at a hyperfocal distance in response to the pressing of the capture button; and keeping the raw image at least before the focusing function is finished. The raw image is processed if the capture button is released before the focusing function is finished.

The processor is also adapted for capturing a second raw image to overwrite said raw image after the focusing function is finished and for processing the second raw image if the capture button is released before the predetermined time period has expired. Furthermore, a third raw image is captured to overwrite the second raw image after the predetermined time period has expired in response to releasing of the capture button.

It the capture button is a three-stage button operable in a half-pressed position and in a fully-pressed position, then the capturing of the first raw image is in response to the pressing of the capture button to the half-pressed position, and the first raw image is processed to the fully-pressed position before the capture button is released before the focusing function is finished.

The automatic focusing camera module further comprises a time keeping module for starting a predetermined time period in response to the finishing of the focusing function. The time keeping module is a timer or a software program to keep track of the time after the focusing function is finished. The processor is also adapted for capturing a second raw image to overwrite the first raw image after the focusing function is finished; and processing the second raw image if the capture button is pressed to the fully-pressed position before the predetermined time period has expired. Furthermore, a third raw image is captured if the capture button is pressed to the fully-pressed position after the predetermined time period has expired.

The software application product or AF algorithm, as depicted in FIG. 7, may comprise a computer readable medium to store a software application. The software application comprises program codes for capturing a first raw image at a hyperfocal distance in response to the pressing of the capture button; and for keeping the first raw image at least before the focusing function is finished. If the capture button is released before the focusing function is finished, then a program code is used to initiate the processing of the first raw image. The software application also has program codes for capturing a second raw image to overwrite said raw image after the focusing function is finished and initiating the processing of the second raw image if the capture button is released before the predetermined time period has expired. The predetermined time period can be started by a program code in response to the finishing of the focusing function. Furthermore, the software application also has program codes for capturing a third raw image to overwrite the second raw image after the predetermined time period has expired in response to the releasing of the capture button.

Figure 8:
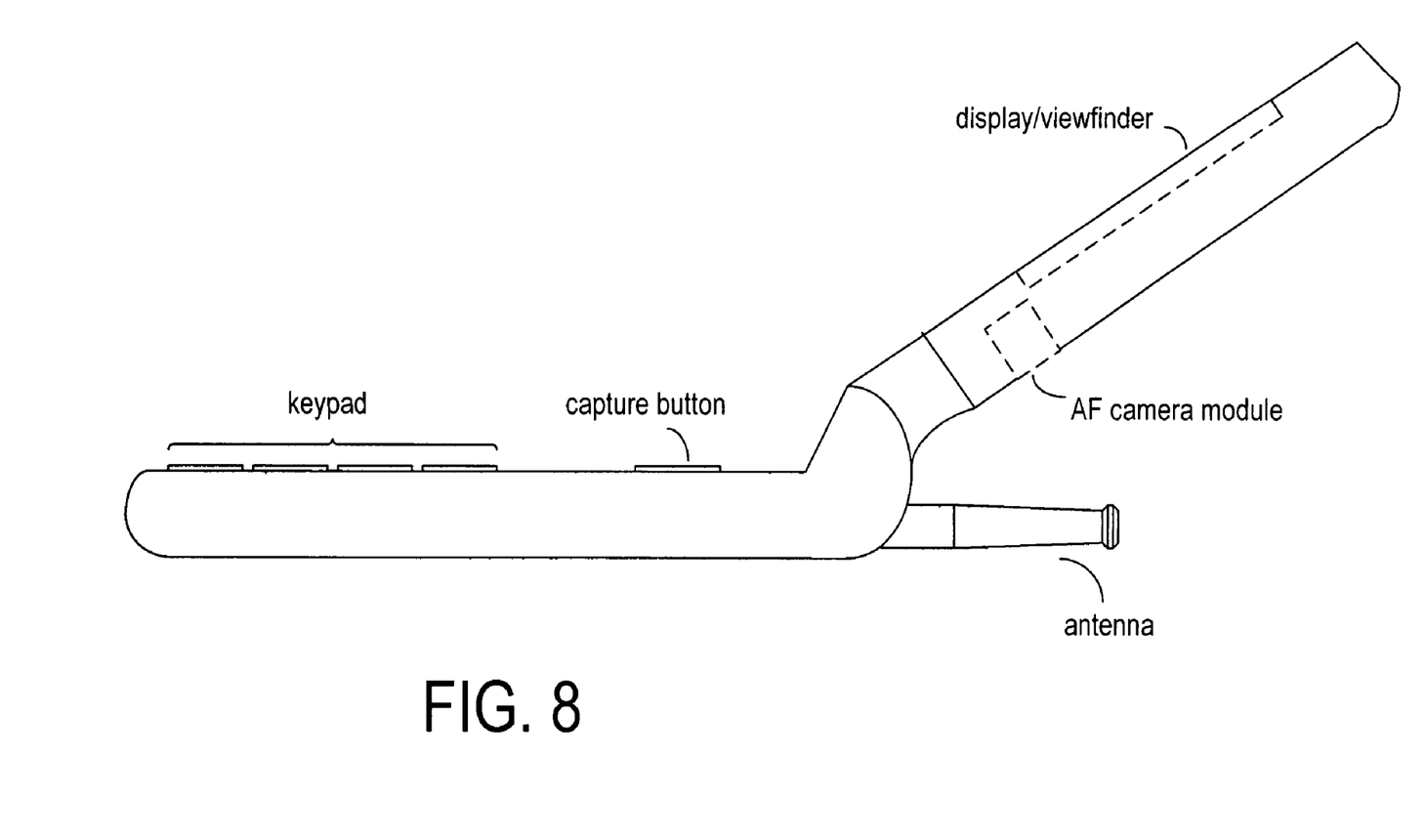
FIG. 8 illustrates an electronic device, such as a mobile terminal, having an auto-focus module, according to the present invention.

FIG. 8 illustrates an electronic device, such a mobile phone, comprising an auto-focus camera module, according to the present invention. However, the auto-focus camera module can be used in a digital camera and in other portable electronic devices, communication device and the like.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method of image capture in a camera having a capture button for image capturing, said method comprising:
   capturing a raw image at a hyperfocal distance in response to a pressing of the capture button, wherein the camera comprises an automatic focusing module for carrying out a focusing function in response to the pressing of the capture button;
   keeping the raw image at least before the focusing function is finished; and
   if the capture button is released before the focusing function is finished, processing said raw image into a processed image and saving the processed image in a storage medium;
   capturing a second raw image after the focusing function is finished, wherein a predetermined time period is started in response to the finishing of the focusing function; and
   if the capture button is released before the predetermined time period has expired, processing the second raw image into a processed image and saving the processed image in the storage medium.

2. A method according to claim 1, wherein the capturing of the second image overwrites said raw image.

3. A method according to claim 1, wherein a predetermined time period is started in response to the finishing of the focusing function, said method further comprising:
   capturing a third raw image after the predetermined time period has expired in response to releasing of the capture button.

4. A method according to claim 3, where the capturing of the third raw image overwrites the second raw image.

5. A method according to claim 1, further comprising:
   processing the third raw image into a processed image and saving the processed image in the storage medium.

6. A method according to claim 1, further comprising:
   indicating completion of the focusing function after the focusing function is finished.

7. A method according to claim 1, wherein a predetermined time period is started in response to the finishing of the focusing function, said method further comprising:
   indicating a recompose state when the predetermined time period has expired.

8. A method according to claim 3, further comprising:
   processing said raw image, the second raw image and the third raw image into a first processed image, a second processed image and a third processed image.

9. A method according to claim 1, wherein the capture button comprises a three-stage capture button operable in a half-pressed position and in a fully-pressed position, and wherein said capturing is in response to the pressing of the capture button to the half-pressed position.

10. A method according to claim 9, further comprising:
    if the capture button is pressed to the fully-pressed position before the capture button is released before the focusing function is finished, processing said raw image into a processed image and saving the processed image in the storage medium.

11. A method according to claim 1, wherein a predetermined time period is started in response to the finishing of the focusing function, said method further comprising:
    capturing a second raw image to overwrite said raw image after the focusing function is finished; and
    processing the second raw image if the capture button is pressed to the fully-pressed position before the predetermined time period has expired.

12. A method according to claim 9, wherein a predetermined time period is started in response to the finishing of the focusing function, said method further comprising:
    capturing a second raw image to overwrite said raw image after the focusing function is finished; and
    capturing a third raw image to overwrite the second raw image if the capture button is pressed to the fully-pressed position after the predetermined time period has expired.

13. A method according to claim 9, wherein a predetermined time period is started in response to the finishing of the focusing function, said method further comprising:
    capturing a second raw image to overwrite said raw image after the focusing function is finished;
    capturing a third raw image to overwrite the second raw image if the capture button is pressed to the fully-pressed position and then released after the predetermined time period has expired; and
    processing the third raw image.

14. A method according to claim 6, wherein the capture button comprises a two-stage capture button, and wherein the capturing of the third raw image is in response to releasing of the capture button.

15. An automatic focusing camera module for use with a lens arranged for forming an image on an image sensor at a separation distance, said module comprising:
    a driving mechanism, operatively connected to one of the lens and the image sensor, for controlling the separation distance;

an automatic focusing control, operatively connected to the driving mechanism, for changing the separation distance for focusing purposes, wherein the focusing control is adapted to carry out a focusing function in response to a pressing of a capture button; and a processor, operatively connected to the focusing control and the image sensor, wherein the processor is adapted for capturing a raw image at a hyperfocal distance in response to the pressing of the capture button;

keeping the raw image at least before the focusing function is finished;

if the capture button is released before the focusing function is finished, processing the raw image into a processed image; and capturing a second raw image to overwrite said raw image after the focusing function is finished, wherein the module further comprises a time keeping module for starting a predetermined time period in response to the finishing of the focusing function, and the processor is further adapted for processing the second raw image into a processed image if the capture button is released before the predetermined time period has expired.

16. An automatic focusing camera module according to claim 15, further comprising a time keeping module for starting a predetermined time period in response to the finishing of the focusing function, wherein the processor is adapted for capturing a third raw image to overwrite the second raw image after the predetermined time period has expired.

17. An automatic focusing camera module according to claim 16, wherein the processor is adapted for processing the third raw image into a processed image, in response to releasing of the capture button.

18. An automatic focusing camera module according to 15, further comprising a time keeping module for starting a predetermined time period in response to the finishing of the focusing function, and wherein the processor is adapted for capturing a second raw image after the focusing function is finished; and capturing a third raw image after the predetermined time period has expired.

19. An automatic focusing camera module according to claim 15, wherein the capture button comprises a three-stage capture button operable in a half-pressed position and in a fully-pressed position, and wherein the capturing of said raw image is in response to the pressing of the capture button to the half-pressed position.

20. An automatic focusing camera module according to claim 19, wherein the processor is adapted for processing said raw image into a processed image if the capture button is pressed to the fully-pressed position before the capture button is released before the focusing function is finished.

21. An automatic focusing camera module according to claim 19, further comprising a time keeping module for starting a predetermined time period in response to the finishing of the focusing function, and wherein the processor is adapted for capturing a second raw image to overwrite said raw image after the focusing function is finished; and processing the second raw image into a processed image if the capture button is pressed to the fully-pressed position before the predetermined time period has expired.

22. An automatic focusing camera module according to claim 19, further comprising a time keeping module for starting a predetermined time period in response to the finishing of the focusing function, and wherein the processor is adapted for capturing a second raw image to overwrite said raw image after the focusing function is finished; and capturing a third raw image if the capture button is pressed to the fully-pressed position after the predetermined time period has expired.

23. A digital camera comprising the lens, the image sensor and the automatic focusing camera module according to claim 15.

24. A mobile phone comprising the lens, the image sensor and the automatic focusing camera module according to claim 15.

25. A computer readable storage medium embodied with a software application for use in image capture in a camera having a capture button for image capturing, the camera comprising an automatic focusing module for carrying out focusing function in response to a pressing of the capture button, said software application comprising:

program code for capturing a raw image at a hyperfocal distance in response to the pressing of the capture button;

program code for keeping the raw image at least before the focusing function is finished;

program code for processing the raw image into a processed image if the capture button is released before the focusing function is finished;

program code for capturing a second raw image to overwrite said raw image after the focusing function is finished;

program code for starting a predetermined time period is started in response to the finishing of the focusing function, and program code for processing the second raw image into a processed image if the capture button is released before the predetermined time period has expired.

26. A computer readable storage medium according to claim 25, wherein the software application further comprises program code for starting a predetermined time period is started in response to the finishing of the focusing function, and program code for capturing a third raw image to overwrite the second raw image after the predetermined time period has expired.

27. A computer readable storage medium according to claim 26, wherein the software application further comprises:

program code for processing the third raw image into a processed image, in response to releasing of the capture button.

28. An automatic focusing camera module for use with a lens arranged for forming an image on an image sensor at a separation distance, said module comprising:

means for controlling the separation distance for focusing purposes, means for carrying out a focusing function in response to a pressing of a capture button;

means for capturing a raw image at a hyperfocal distance in response to the pressing of the capture button; keeping the raw image at least before the focusing function is finished; and processing the raw image into a processed image if the capture button is released before the focusing function is finished; and means for keeping time in response to the finishing of the focusing function, wherein the capturing means is adapted for capturing a second raw image to overwrite said raw image after the focusing function is finished; processing the second raw image if the capture button is released before a predetermined time period has expired; and capturing and processing a third raw image into a processed image in response to releasing of the capture button after the predetermined time period has expired.

29. An automatic focusing camera module according to claim 15, further comprising:
a storage medium for storing the processed image after said processing, if the capture button is released before the predetermined time period has expired.

30. A computer readable storage medium according to claim 25, wherein said software application further comprises:
program code for saving the processed image in a storage medium, if the capture button is released before the predetermined time period has expired.

31. An automatic focusing camera module according to claim 28, further comprising:
means for storing the processed image after said processing, if the capture button is released before the predetermined time period has expired.

* * * * *

UNITED STATES PATENT AND TRADEMARK OFFICE
CERTIFICATE OF CORRECTION

| | | |
|---|---|---|
| PATENT NO. | : 7,889,266 B2 | |
| APPLICATION NO. | : 11/598219 | |
| DATED | : February 15, 2011 | |
| INVENTOR(S) | : Jarno Nikkanen et al. | |

It is certified that error appears in the above-identified patent and that said Letters Patent is hereby corrected as shown below:

*In column 8, line 58, claim 14, line 1*

"*6*" *should be* -- 3 --.

Signed and Sealed this
Fifth Day of July, 2011

David J. Kappos
*Director of the United States Patent and Trademark Office*